(12) United States Patent
Gilboa et al.

(10) Patent No.: US 8,781,089 B2
(45) Date of Patent: Jul. 15, 2014

(54) SYSTEM, METHOD AND DEVICE FOR MANAGING VOIP TELECOMMUNICATIONS

(76) Inventors: Shai Haim Gilboa, Atlit (IL); Daniel Fogel, Bat Yam (IL)

( * ) Notice: Subject to any disclaimer, the term of this patent is extended or adjusted under 35 U.S.C. 154(b) by 1463 days.

(21) Appl. No.: 11/937,930

(22) Filed: Nov. 9, 2007

(65) Prior Publication Data

US 2009/0122726 A1 May 14, 2009

Related U.S. Application Data

(60) Provisional application No. 60/865,059, filed on Nov. 9, 2006.

(51) Int. Cl.
*G06Q 99/00* (2006.01)
*H04M 15/00* (2006.01)

(52) U.S. Cl.
CPC .............. *H04M 15/00* (2013.01); *H04M 15/82* (2013.01); *H04M 2215/0176* (2013.01); *H04M 2215/44* (2013.01)
USPC ............. 379/114.03; 379/114.23; 379/115.01

(58) Field of Classification Search
USPC ........................... 379/114.03, 114.23, 115.01
See application file for complete search history.

(56) References Cited

U.S. PATENT DOCUMENTS

| | | | |
|---|---|---|---|
| 6,788,675 B1 | 9/2004 | Yang | 370/352 |
| 6,813,497 B2 * | 11/2004 | Hutcheson et al. | 455/453 |
| 6,839,356 B2 | 1/2005 | Barany et al. | 370/401 |
| 6,993,326 B2 | 1/2006 | Link, II et al. | 455/414.1 |
| 7,136,478 B1 * | 11/2006 | Brand et al. | 379/265.09 |
| 7,200,139 B1 | 4/2007 | Chu et al. | 370/352 |
| 7,218,712 B2 * | 5/2007 | de Nicolas et al. | 379/120 |
| 2001/0001000 A1 | 5/2001 | Thomas et al. | 370/200 |
| 2002/0076019 A1 | 6/2002 | Tandon et al. | 379/114.14 |
| 2002/0103647 A1 | 8/2002 | Houplain | 704/260 |

(Continued)

FOREIGN PATENT DOCUMENTS

| | | |
|---|---|---|
| DE | 20 2005 008 640 U1 | 7/2006 |
| EP | 1 379 068 A1 | 1/2004 |

(Continued)

OTHER PUBLICATIONS (Understanding Your Telephone Bill FCC Consumer Facts, http://web.archive.org/web/20060926093455/http://www.fcc.gov/cgb/consumerfacts/understanding.html, 6 pages.*

(Continued)

*Primary Examiner* — James D Nigh
(74) *Attorney, Agent, or Firm* — Grasso PLLC; Fred Grasso

(57) ABSTRACT

A system, method or device for sharing revenue for incoming Voice over Internet Protocol (VoIP) calls between a VoIP service provider and VoIP service subscribers. The VoIP subscribers may earn credits for receiving incoming calls from a first network to an Internet Protocol (IP) network, based on a revenue sharing model. The first network may be any cellular, fixed line or other IP network in the world. The user earns credits for incoming calls to his softphone, initiated by any landline, mobile phone or VoIP phone user in the world, which dials his local number. After the softphone user accumulates credits, he may be able to initiate outgoing calls to any telephone in the world, by using his credits. The user can also register others for the service (using email or any other method), and obtain a portion of their credits, when they receive incoming calls to their softphones from external callers.

27 Claims, 6 Drawing Sheets

(56) References Cited

U.S. PATENT DOCUMENTS

| | | | |
|---|---|---|---|
| 2002/0107027 A1 | 8/2002 | O'Neil | 455/456 |
| 2003/0216964 A1* | 11/2003 | MacLean et al. | 705/14 |
| 2004/0204084 A1 | 10/2004 | Tan et al. | 455/557 |
| 2004/0228336 A1* | 11/2004 | Kung et al. | 370/352 |
| 2005/0078809 A1* | 4/2005 | Nicolas et al. | 379/120 |
| 2005/0094623 A1* | 5/2005 | D'Eletto | 370/352 |
| 2005/0160166 A1 | 7/2005 | Kraenzel | 709/224 |
| 2005/0286466 A1 | 12/2005 | Tagg et al. | 370/329 |
| 2006/0015399 A1 | 1/2006 | Alberth, Jr. et al. | 705/14 |
| 2006/0111974 A1* | 5/2006 | Nashed | 705/14 |
| 2006/0245395 A1 | 11/2006 | Jain et al. | 370/331 |
| 2006/0268833 A1 | 11/2006 | Yardley | 370/352 |
| 2007/0002837 A1 | 1/2007 | Tan | 370/352 |
| 2007/0049245 A1 | 3/2007 | Lipman | 455/406 |
| 2007/0078708 A1 | 4/2007 | Yu et al. | 705/14 |
| 2007/0081662 A1* | 4/2007 | Altberg et al. | 379/355.03 |
| 2007/0165823 A1 | 7/2007 | Haldeman et al. | 379/218.01 |
| 2007/0174258 A1 | 7/2007 | Jones et al. | 707/3 |
| 2007/0201636 A1 | 8/2007 | Gilbert et al. | 379/88.14 |
| 2007/0254629 A1* | 11/2007 | Black et al. | 455/406 |

FOREIGN PATENT DOCUMENTS

| | | |
|---|---|---|
| WO | WO 01/31497 | 5/2001 |
| WO | WO 2004/112268 | 12/2004 |
| WO | WO 2007/089967 | 8/2007 |

OTHER PUBLICATIONS

Consumer Facts (Understanding Your Telephone Bill FCC Consumer Facts, http://web.archive.org/web/20060926093455/http://www.fcc.gov/cgb/consumerfacts/understanding.html, 6 pages, hereinafter referred to as FCC Consumer Facts).*

Tehrani, Rich, "Getting Paid to VoIP", VoIP Blog —Tehrani.com, Internet at <http://blog.tmcnet.com/blog/rich-tehrani/voip/getting-paid-to-voip.html>, Feb. 14, 2006, 4 pages.

Keating, Tom, "Cash Back VoIP Calling", VoIP & Gadgets Blog, Internet at <http://blog.tmcnet.com/blog/tom-keating/voip/cash-back-voip-calling.asp>, Feb. 14, 2006, 5 pages.

Kolodziej, Krzysztof, Navizon—The Ultimate Personal Navigation Companion?, *Directions Magazine*, Internet at <http://www.directionsmag.com/printer.php?article_id=2266>, Aug. 29, 2006, 3 pages.

Relph-Knight, Terry, "VoIP Toolkit: A Guide to VoIP Telephony", ZDNet.co.uk, Internet at <http://reviews.zdnet.co.uk/hardware/networking/0,100000696,39279773,00.htm>, Jul. 26, 2006, 3 pages.

"Tpad—The Global Phone Network", Internet at <http://web.archive.org/web/20061114133459/www.tpad.com/products.php>, copyright 2006, 2 pages.

"What Do You Want to See from VoIP User?", <http://www.voipuser.org/forum_topic_5972.html>, Jun. 19, 2006, 5 pages.

"Receive Calls on VOIP & Get Credits", Internet at <http://voipguides.blogspot.com/2006/12/receive-calls-on-voip-get-credits.html>, Dec. 15, 2006, 3 pages.

Baltatzis, Patrick, "Why VOIP is Headed for Your Cell Phone", *CNN Money.com*, Internet at <http://money.cnn.com/2006/05/04/technology/business2_thirdscreen/index.htm>, May 4, 2006, 2 pages.

CallWave, Inc., "CallWave Announces National Availability of First VoIP-Enhanced Cell Phone", *Business Wire*, Internet at <http://www.internetvideomag.com/News/News2005/070405Callwave.htm>, Aug. 4, 2005, 3 pages.

Blau, John, "New VoIP Service for Cell Phones", *PC World*, Internet at <http://www.pcworld.com/printable/article/id,129114/printable.html>, Feb. 16, 2007, 2 pages.

Shinder, Deb, "USB Devices Make VoIP Portable", *CNET Networks Business*, Internet at <http://articles.techrepublic.com.com/5100-1035_11-6168126.html>, Mar. 16, 2007, 4 pages.

"SyChip Unveils SyVoice™ Family of VoIP Solutions for the Mobile Handset Market", SyChip, Inc., May 23, 2005, 2 pages.

"VWLAN7101 Product Brief; Embedded Module for Mobile Voice Over IP (VoIP) Applications"; SyChip, Inc., no date, 2 pages.

Nass, Richard, "VoIP Module can be Integrated into Digital Handsets", *CommsDesign*, Internet at http://www.commsdesign.com, May 24, 2005, 3 pages.

UTStarcom, Inc., "UTStarcom Introduces the World's First PAS Handset with Embedded Personal Identity Module Technology at the PT/Expo Comm China 2004 Show in Beijing", *PR Newswire*, Internet at <http://investorrelations.utstar.com/ReleaseDetail.cfm?ReleaseID=146378>, Oct. 25, 2004, 3 pages.

"SIM Card for Your VoIP Phone", LucaFiligheddu.com, Internet at <http://www.lucafiligheddu.com/2006/10/sim-card-for-your-voip-phone.html>, 2006, 8 pages.

Cassia, Fernando, "VoIP to GSM Gateway can Save You a Bundle", *The Inquirer*, Internet at <http://www.theinquirer.net/en/inquirer/news/2005/10/05/voip-to-gsm-qatewat-can-save-you-a-bundle.html>, Oct. 5, 2005, 4 pages.

Noyes, Katherine, "Big Brother Eyes VoIP? The Proof Is in the Pudding", *TechNews World*, Internet at <http://www.technewsworld.com/story/59483.html>, Sep. 24, 2007, 2 pages.

Pushback from a Customer on Voice Ads—Gnutella Forums, Internet at <http://www.gnutellaforums.com/rants/17900-pushback-customer-voice-ads.html> copyright 2000-2007, Jelsoft Enterprises Ltd, 4 pages.

"TMN Promotes Mass Use of Mobile Phones and Adds a Revolutionary Concept to its Prepaid Cards: PAKO Charged by Incoming Calls", Internet Citation, [Online] XP-002224217, <URL:http://www.tmn.pt/tmn/noticias/2000_17abr_1.shtml> [retrieved on Dec. 9, 2002, 1 page.

Schaefer, Volker, "VIAG: Bei Anruf—Guthaben", Internet Citation, [Online] XP-002224216, <URL:http://www.teltarif.de/arch/2000/kw44/s3423.html> [retrieved on Dec. 12, 2002, 1 page.

\* cited by examiner

SYSTEM, METHOD AND DEVICE FOR MANAGING VOIP TELECOMMUNICATIONS

This application claims priority to U.S. Provisional Application Ser. No. 60/865,059, filed Nov. 9, 2006, the entirety of which is incorporated herein by reference.

FIELD OF INVENTION

The present invention relates to systems, methods, and devices that manage and facilitate Voice over Internet Protocol telephony. More particularly, systems, methods and devices are employed that manage costs and fees and allocate costs and fees among and between parties carrying VoIP telecommunications and among and between parties participating in VoIP telecommunications.

BACKGROUND

A wide area network covers and interconnects the world. This network facilitates innumerable types of communications including data communications and voice communications. The voice communications may be carried over the Public Switched Telephone Network (PSTN) while the data communications may be carried over the Internet using data communications protocols such as TCP/IP (Transmission Control Protocol/Internet Protocol) and UDP (User Datagram Protocol). These two networks as well as others are interconnected such that electronic signals may be transferred between them, back and forth, depending upon the type of electronic signal, the originating point of the electronic signal, and the destination of the electronic signal.

People throughout the world have access to the Internet and the PSTN. The backbone that comprises the Internet runs thru much of our environment. This infrastructure is made up of many components including fixed and rigid connections, cabling, routers, switches and the like. It also includes user specific equipment such as Asymetric Digital Subscriber Lines (ADSL) and cable modem connections.

Voice over Internet Protocol (VoIP) has grown in popularity. VoIP is an acronym that stands for the concept of carrying voice communications, usually carried over the PSTN, over the Internet. These voice communications are carried over the Internet in small data packets that are disassembled at a transmission point on the Internet and reassembled at receipt point when the transmission reaches a recipient or jumps from the Internet to another network, such as the PSTN. When a communication jumps from the Internet to the PSTN, a charge may be levied to the sender of the communication or the entity supporting the communication by an entity maintaining a gateway that facilitates the jump of the communication between networks. This gateway may perform translation functions to facilitate the transfer of the communication between networks.

In certain telephony services, the user is required to pay for being connected, performing outgoing calls to the public switched telephony network (PSTN), and for additional services such as voice mails, Direct Inward Dialing (DID) numbers, etc. in certain VoIP services, peer-to-peer calls between users of the same VoIP service providers may be free of charge. However, when a user wants to place a call outside of the Internet, to an external landline or to a cellular phone, the user is often charged as a method of generating revenues for the VoIP service provider.

SUMMARY OF INVENTION

The present invention provides a telephony service employing systems, methods and devices in which subscribers (users) are credited as they receive incoming calls from persons outside the telephony service by the service provider through a revenue sharing model. In certain embodiments, credit is allocated to a call recipient's account for incoming calls from cellular or fixed line devices based on a revenue sharing model.

In one embodiment, the VoIP service provider generates profits by getting the interconnect fees from other telephony providers for incoming calls to its network and its subscribers. The VoIP service provider credits users for receiving incoming calls from external telephony providers from revenues generated from the interconnect fees from other external telephony providers.

The VoIP service provider may provide a gateway between a first network and an Internet Protocol (IP) network so as to charge a fee for incoming calls from the first network. In one embodiment, the first network may be a fixed line network, a cellular network, or other IP network. The VoIP service provider may then credit subscriber's account for receiving incoming calls from via the first network The credits that users accumulate may be used for make outgoing calls from the VoIP provider via the first network, without the hassles of payments, and buying prepaid or calling card services. The credits may also be used to purchase goods and services from the telephony service provider and affiliated retail merchants or ecommerce websites.

Embodiments of the present invention allow users to enjoy mobility, and to reduce expense by using VOIP technology and the inventive revenue sharing model. Also, by providing users with their own phone number, regardless of his location in the world, users may be reached by anyone who knows their numbers. As the user receives calls and communicates, he has access to the revenue sharing model and may be so credited.

Embodiments of the present invention may also allow users, in some circumstances, to obtain free telephony service, without paying for it at all. In addition, embodiments may also include a multi-user multi-tier revenue sharing credit model, which allows users to recruit and sign-up others to the VoIP service provider and receive credits for their incomings call as well.

Embodiments of the present invention may also allow users, in some circumstances, to have more then one Direct In Dialing (DID) number, which are located in different countries world wide, and associated with a specific user and telephone. In those cases, incoming calls to the user may come from different locations at the same time, or one at a time, using those DID numbers. The user may be credited for each and all incoming calls. This is relevant also for multiple concurrent incoming calls to the user's telephone.

Other objects, features, and advantages of one or more embodiments of the present invention are also plausible.

BRIEF DESCRIPTION OF THE DRAWINGS

Embodiments of the present invention are provided, by way of example only, with reference to the accompanying schematic drawings in which corresponding reference symbols indicate corresponding parts, in which.

DETAILED DESCRIPTION OF INVENTION

Figure 1:
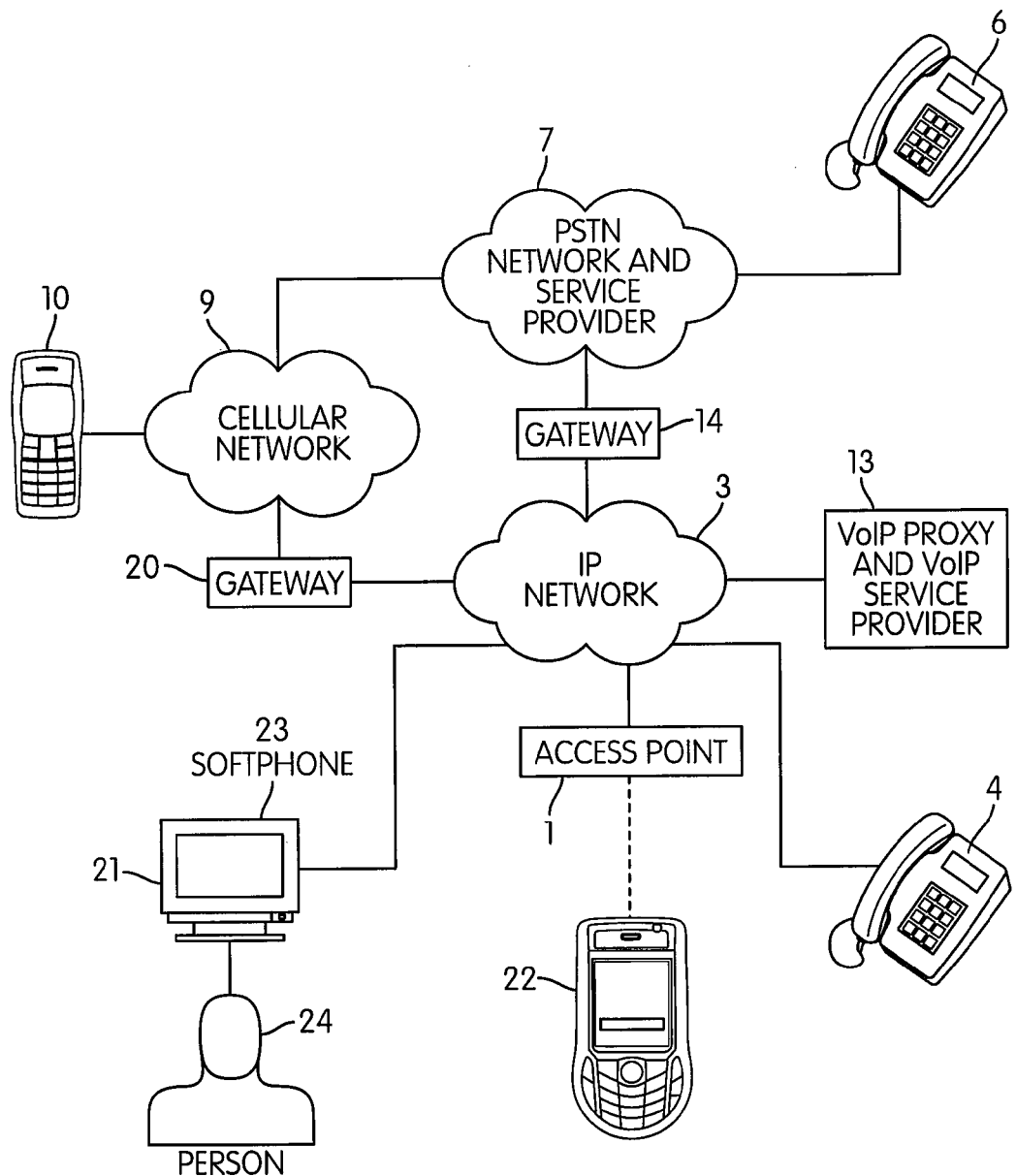
FIG. 1 shows the architecture of a telephony system, in accordance with an embodiment of the present invention.

FIG. 1 shows the architecture of the telephony system, in accordance with an embodiment of the present invention. A plurality of end users 24 (although only one is depicted) may be connected to an IP network 3 using a computer 21.

IP network 3 may by the Internet or any Internet Protocol (IP) based network, or a combination thereof. The computer 21 may be, for example, a desktop computer, a laptop computer, phone, gaming console, PDA, server, wireless device or the like, which runs a IP-phone client application (or "softphone") 23. The softphone 23 may be any application for making calls over the Internet or IP-based network. In one embodiment, the softphone 23 runs on an Analog Terminal Adaptor (ATA) provided with an analog phone.

Other telephony devices may also be provided in the architecture. For example, an IP phone 4 may be connected directly to the IP network 3 and may be configured to receive and initiate VoIP calls. In other embodiments, a phone may be connected to the IP network 3 through another IP network via a gateway. A mobile device 22, such as Blackberry® or other PDA, may also be connected to the IP network 3 via a wireless access point 1. The mobile phone device 22 may also be configured to receive and initiate VoIP calls. Similarly, a regular phone 6 may also be connected via a public switching telephony network (PSTN) 7. The PSTN 7 may be connected to the cellular network 9 and the IP network 3 via a gateway 14.

A cellular phone 10, which wirelessly connects to a cellular network 9, may also be provided. The cellular network 9 may be connected to the IP network 3 via gateway 20. The cellular phone 10 may be configured to make/receive VoIP calls or may be made VoIP-enabled.

In this embodiment, the softphone 23, which is installed on the computer 21, allows the user 24 to initiate calls to any other phone or softphone via the IP network 3, e.g., the IP phone 4, the regular phone 6, the cellular phone 10, the mobile phone device 22, and other softphones 23 (not shown). Calls between IP phones 4, softphones 23, and other VoIP-enabled devices can be made using VoIP via the IP network 3. These calls may be voice or video, or both, depending whether the particular device can accommodate such features (e.g., softphone, videophone type).

Calls which terminate in the PSTN 7 require the call medium to be converted from VoIP to analog or digital Pulse Code Modulation (PCM) protocol and vice-versa by the gateway 14. Similarly, calls may be initiated in the opposite direction, i.e., the call is initiated by the regular PSTN phone 6 via the PSTN 7, the gateway 14, and the IP network 3. Calls which terminate in the cellular network 9 may require the call medium to be converted from VoIP to a cellular communication protocol, such as Global System for Mobile (GSM), and vice-versa by gateway 20. Connections outside IP network 3 may require access through a VoIP proxy 13 of VoIP service provider, which may require registration and authentication for using its services.

Figure 2:
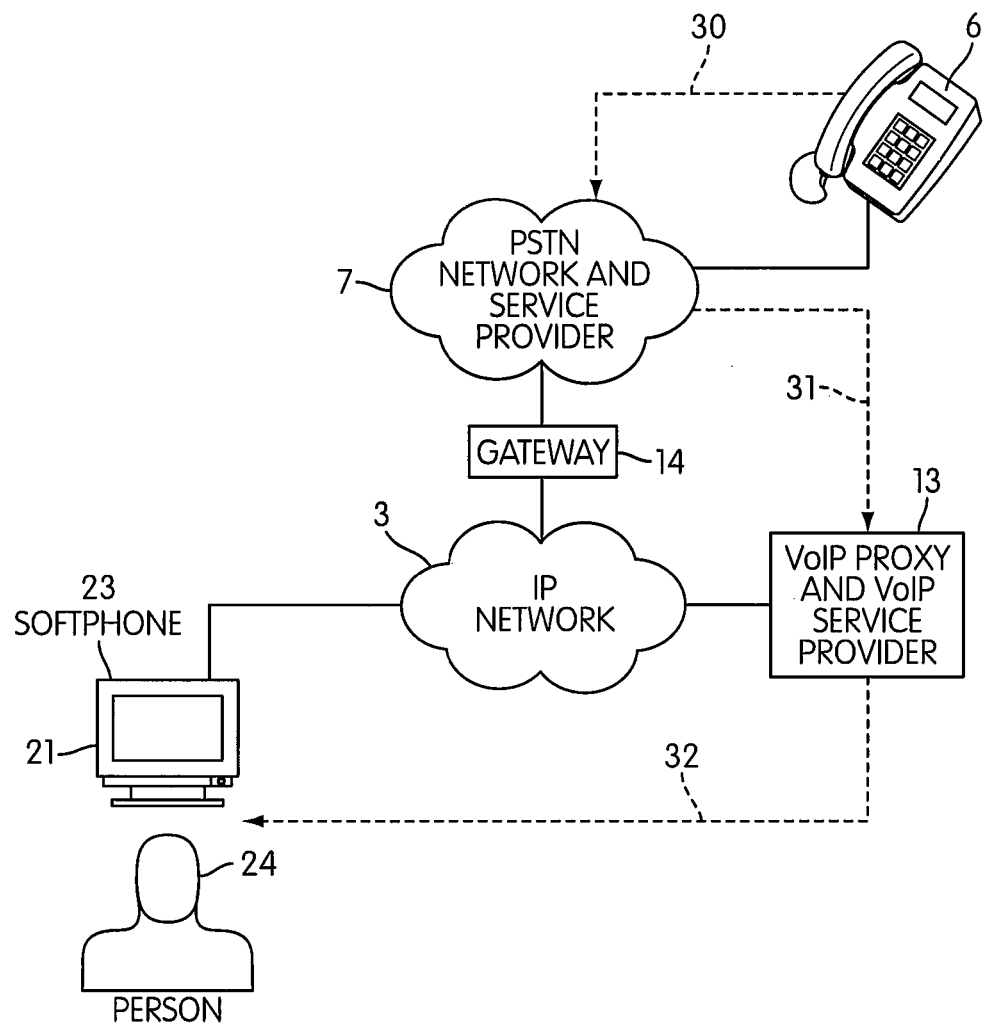
FIG. 2 shows an example of an incoming call scenario, and a revenue sharing model, in accordance with an embodiment of the present invention.

FIG. 2 shows an example of an incoming call scenario, and a revenue sharing model, in accordance with an embodiment of the present invention. The regular phone 6, which is connected to the PSTN 7, initiates a call to a user 24 by dialing to the VOIP softphone 23 on the computer 21. To initiate a call, the regular phone 6 may dial the softphone number associated with the user 24. Softphone numbers may be assigned by the VoIP service provider 13 to VoIP subscribers (users), which correspond to national numbers for the country were the softphone and/or VoIP service provider are located. Thus, from the regular phone 6 user's perspective, it appear as if that person is making an ordinary phone call, e.g., a local, national, or international telephone call, depending on the location of the regular phone number and the location of the assigned softphone number.

VoIP service providers may allow VoIP subscribers (users) to purchase multiple numbers which correspond to national numbers for different countries. Thus, it may appear that the regular phone 6 user is merely making a local or national call, when in fact the softphone end user 24 may be in another country.

Once a connection is established through the VoIP proxy 13, a telephone-like conversation can occur between the regular phone 6 and the softphone 23 on the computer 21, via the PSTN 7 and IP network 3. The call media is converted between PCM (or digital or analog) data to VOIP via gateway 14.

A revenue sharing model, in accordance with embodiments of the present invention, may include the following steps. The subscriber (user) of the PSTN 7 may be charged for calls made by the regular phone 6 via PSTN 7. The PSTN service provider may be credited for each call. This credit may generate revenues for the PSTN service provider. This revenue path is depicted by arrow 30.

A connection may be established between the PSTN 7 and the IP network 3 via gateway 14. At the time of connection, the VOIP service provider 13 may charge the PSTN service provider for the call. This is depicted by arrow 31. The VoIP service provider 13 may then be credited for the call. This credit generates revenues for the VoIP service provider.

In accordance with the revenue generating model, the VOIP service provider 13 allows the end user 24, which is using the softphone 23, to earn credits from the VoIP service provider's revenue. This is shown with arrow 32. This scenario allows the end user 24 to earn credits from the VOIP service provider 13 for incoming calls processed by the VoIP service provider 13. Calls made between VoIP phones 23 or other VoIP enabled devices through IP network 3, however, are generally treated as normal Internet traffic and there may be no charge for the call.

For incoming calls from PSTN 7 to VoIP softphones 23 or other VoIP enabled devices, the PSTN caller may be charged at a rate that depends on the type of conventional number assigned to the VoIP phone.

The credits earned by the end user 24 may be used by the end user 24 later to perform outgoing calls, without the need to pay for the service. This credit can also be used by the user 24 for other purchases of goods or services.

For calls from VoIP softphones 23 or other VoIP enabled devices to PSTN phones 6, the callers (user 24) may be charged by the VoIP service provider, because they must pass through the gateway 14 maintained by the VoIP service provider 13. Similarly, VoIP subscribers (user) might also be charged for incoming calls via the cellular network 9 or other IP network, in a similar manner, because they must pass through gateways maintained by the VoIP service provider 13.

The credits earned by user 24 may also be used to offset fees associated with outgoing phone calls via the PSTN 7, cellular network 9, or other IP network. Additional credits may also be purchased through the VoIP service provider, if necessary.

Figure 3:
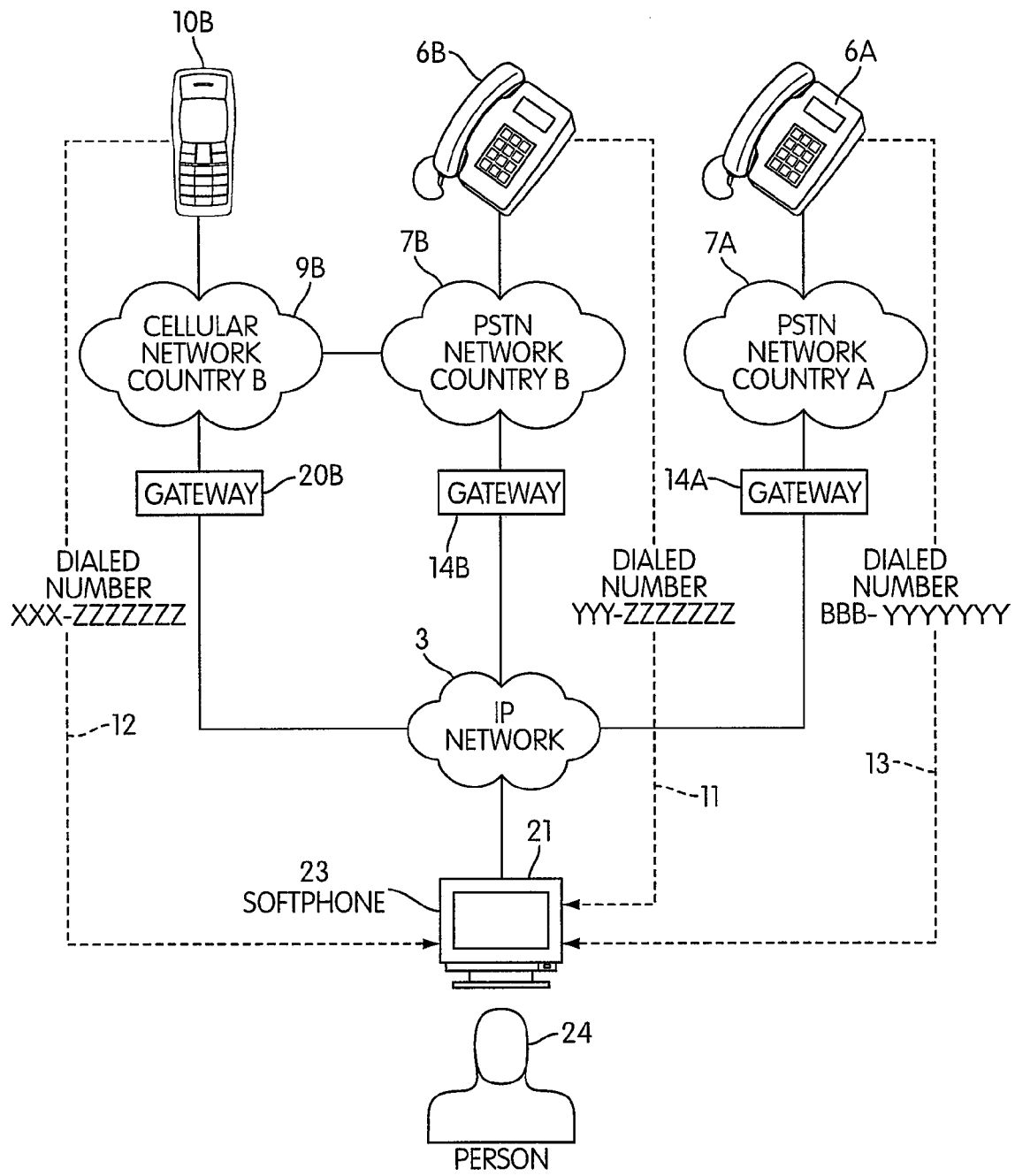
FIG. 3 shows the model of multi Direct In Dialing (DID) numbers method of a specific user, in accordance with an embodiment of the present invention.

FIG. 3 shows the model of multi Direct in Dialing (DID) numbers method of a specific user 24, in accordance with an embodiment of the present invention. For example, the softphone 23 may be running on the computer 21, which has three phone numbers associated with it.

Telephone 6A is connected to the PSTN 7A of country 'A'. This telephone can place a call to the softphone 23 running on the computer 21, by dialing a local country 'A' internal number (e.g., bbb-yyyyyyy). The call may be directed via the PSTN 7A, to gateway 14A, in country A, and then via the IP network 3 to the softphone 23 running on the computer 21. The path of this call is depicted by arrow 13.

The same scenario may be true for the telephone 6B in country 'B'. This telephone can place a call to the softphone 23 running on the computer 21, by dialing a local country 'B' internal number (e.g., yyy-zzzzzzz). The call may be directed via the PSTN 7B to gateway 14B in country B, and then via the IP network 3 to the softphone 23 running on the computer 21. The path of this call is depicted by arrow 11.

A similar situation may occur for the cellular phone 10B, which is located in country 'B'. The cellular phone 10B can dial the softphone 23 running on computer 21, by dialing the local country 'B' internal number (e.g., yyy-zzzzzzz). The call is routed via cellular network 9B, via the local gateway 20A and via the Internet to softphone 23 running on computer 21. The call path is shown in arrow 12.

In this way, the softphone 23 running on the computer 21 may have three different local numbers for two different countries. The softphone 23 can receive one or more calls at the same time, and get credits by each of the incoming calls.

Figure 4:
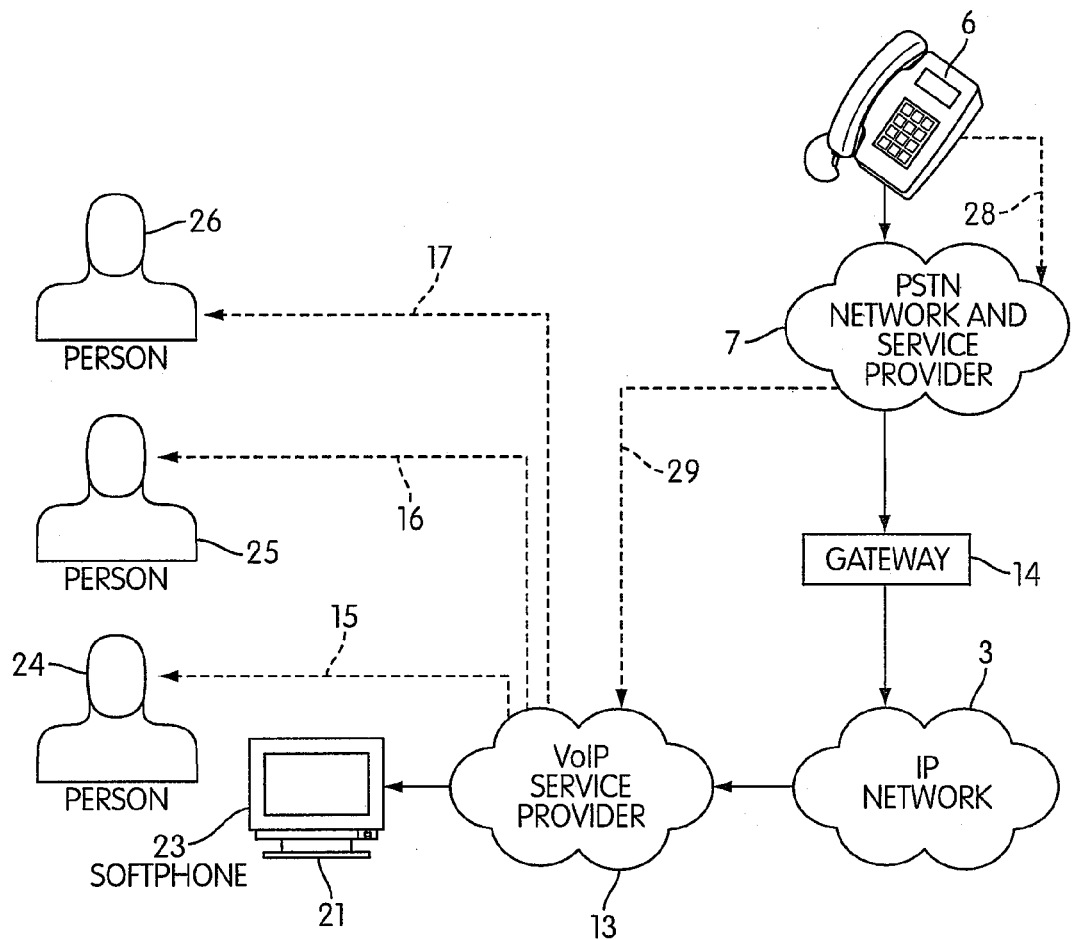
FIG. 4 shows a multi-level users revenue sharing credit model, in accordance with an embodiment of the present invention.

FIG. 4 shows a multi-level users credit revenue sharing model, in accordance with an embodiment of the present invention. The regular phone 6, which is connected to the PSTN 7 initiates a call, by dialing the number of the VOIP softphone 23. The regular phone 6 initiates this call by dialing the softphone 23 number (e.g., either a local, national or international number). The phone call may then be initiated between the regular phone 6 and the softphone 23, which runs on the computer 21, via the PSTN 7, the IP network 3, and the VoIP service provider 13. The call media may be converted from PCM (or digital or analog) data to VOIP and vice-versa by the gateway 14. In this scenario, the PSTN subscriber on regular phone 6 pays for the call to the PSTN service provider 13, which is the logic path depicted by arrow 28.

The PSTN service provider pays the VoIP service provider 13 interconnect fees, which is the logic path depicted by arrow 29. The VoIP service provider 13 may then credit the end user 24, which is using the softphone 23, with a portion of its own revenue, which is the logic path depicted as 15.

This scenario allows the end user 24 to earn credits from the VoIP service provider 13. These credits may allow end user 24 later to outset the fees for outgoing calls, without the need to pay for the service. In some embodiments, credits may also be used by the user 24 for the purchases of goods or services. For example, the VoIP service provider 13 may provide a website, or alternatively be affiliated with retail merchants or ecommerce sites, who may redeem the credits for the purchase of goods or services.

In some embodiments, it is possible to have a multi-generation revenue sharing model. In general, users of the telephony service can invite other users (e.g., friends and family members) to the service, and get a portion of the invited users' incoming calls credits. For example, as shown in FIG. 4, user 26 may have originally invited user 25 to the service, who in turn then invited user 24 to the service. In this case, when user 24 gets credited from the telephony service provider for incoming calls, which is the logic path depicted by arrow 15, the telephony service provider 13 also credits a portion of user's 24 credits to user 25, which is the logic path depicted by arrow 16, and to user 26, which is the logic path depicted by arrow 17. Thus, each user may be awarded with a part of the credits of the persons that he registered, in turn had registered, and so on, up to 'n' generations.

In FIG. 4, the telephony service provider 13 is connected via the IP network 3 to the PSTN 7, and directly to the computer 21. In other embodiments, the computer 21 may be alternatively connected to the telephony service provider 13 via the IP network 3, and telephony service provider 13 can be directly connected to the PSTN 7 via the gateway 14 without IP network 3 in the middle. It will be appreciated that other system architectures exist within the scope of the present invention.

Figure 5:
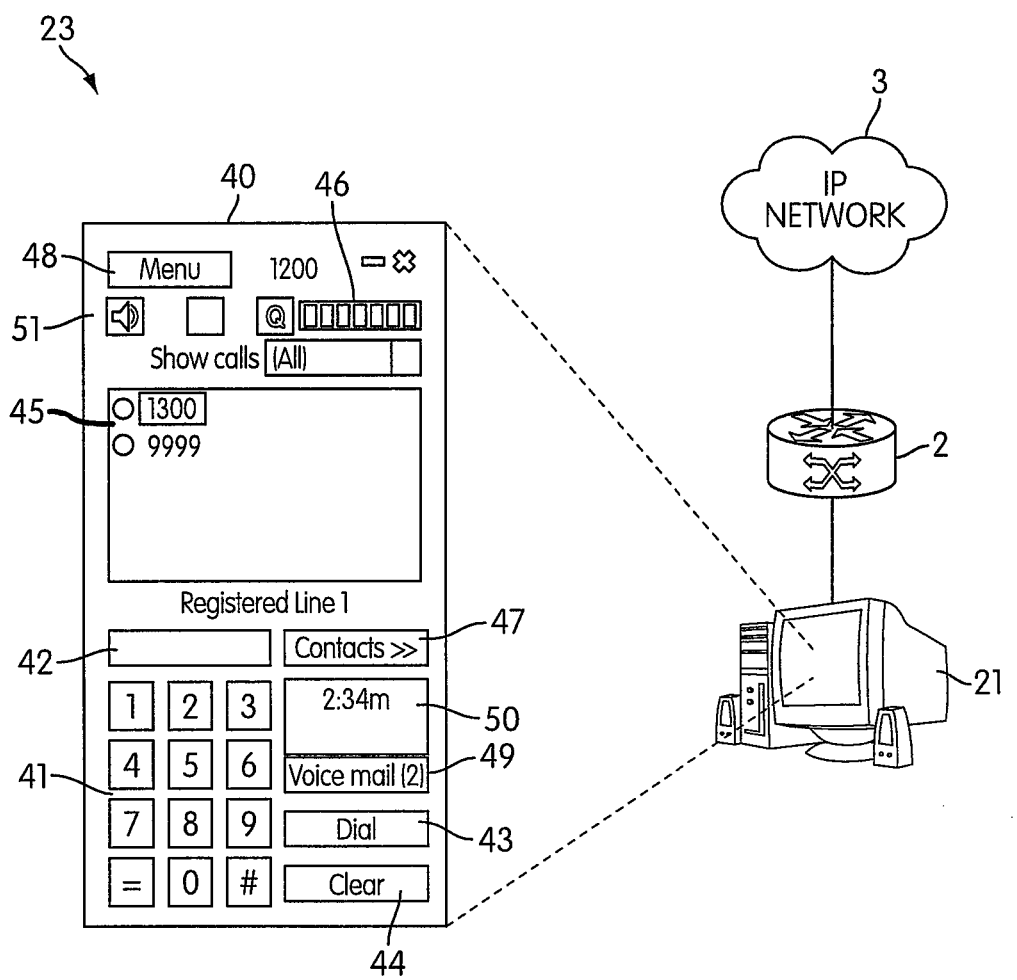
FIG. 5 shows a softphone, in accordance with an embodiment of the present invention.

FIG. 5 shows a softphone client, in accordance with an embodiment of the present invention. Softphone 23 may be installed on the computer 21, and may initiate calls to and receives calls from the IP network 3 via a node 2. The node 2, for example, may be a router or other gateway to the IP network 3.

A user may download the softphone 23 to his computer 21 from an Internet website provided by the VoIP service provider 13. After a short registration to set up an account, for example, where the user inputs a user name, password and email address, financial information, etc., the user automatically obtains a local softphone number in each country he desires. The user can have multiple softphone numbers for an unlimited number of countries directed to his softphone 23. The user can also register others for the service (using email or any other method), and to later get a portion of their credits, when they receive incoming calls to their softphones 23 from external callers.

In use, a display 40 of the softphone 23 will appear on a monitor (or other display device) of the computer 21. A keypad 41, which simulate the keypad on a regular telephone is shown. By using a pointing and selecting device (e.g., mouse or stylus), the user may select numbers on the keypad 41, which may then appear in a box 42. To dial the phone number in box 42 the user may select a "dial" button 43. Alternately, the user may select a "clear" button 44 to clear box 42.

A call window 45 shows recent numbers that the softphone 23 has made or received. Further information regarding the call, such as duration, may be obtaining by clicking or hovering over the particular phone numbers. A call status indicator 46 indicates the status of a current call (e.g., connected or disconnected, and the quality of service level of the call).

The softphone 23 may have other features desired by users, such as a "Contacts" list button 47 for a database of contact persons' information including phone numbers, and a "Menu" button 48 for customization of the softphone or other options, a "Voice Mail" button 49 indicates the number of current voice mails the user may have. By selecting the voice mail button 49, the user may have options to review, save or delete voice mails. It will be appreciated that the softphone may include other features and functions (not shown), but available for softphones.

Credits received by the VoIP subscriber may be displayed on a credits indicator 50. Credits may include calling minutes, minutes per specific destination (e.g., number or country) which may be dialed, points or cash equivalents. When calls are received by the softphone 23, the user receives credits from the VoIP service provider.

Also, when the user makes outgoing calls terminating in a PSTN 7 or cellular network 9 softphone 23, credits may be subtracted/debited to the subscriber's (user) account by the service provider. The credits indicator 50 may be updated, accordingly. In one embodiment, the credits indicator 50 enables the subscriber to evaluate the amount of credits left in his account for an ongoing call or future calls, in real-time.

Alternatively, or in addition to the credits indicator 50, the softphone 23 may audibly announce, for the user to hear, the number of credits during the call (e.g., before, during or after conversation). For example, in one embodiment, the softphone 23 may announce the number of credits that the user has earned, or used up, during the call, as well as, the balance of credits remaining. A sound button 51 may be provided for turning on and off the announcing feature.

Figure 6:
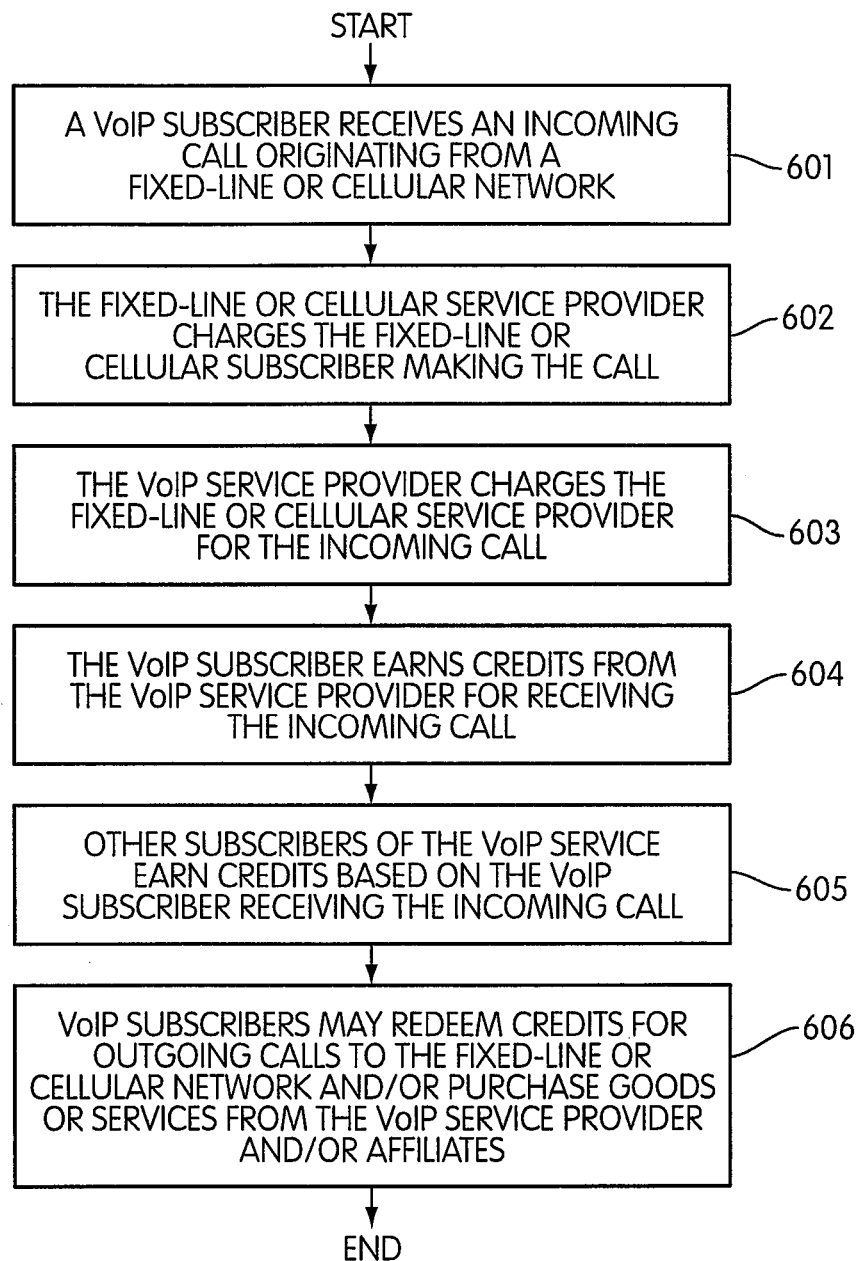
FIG. 6 is a flowchart of the steps for earning credits for an incoming call, in accordance with an embodiment of the present invention.

FIG. 6 is a flowchart of the steps for earning credits for an incoming call, in accordance with an embodiment of the present invention. In step 601, a subscriber (user) 24 of the VoIP service provider 13, which is using the softphone 23, may receive an incoming call originating from a fixed line network, e.g., PSTN 7, via the gateway 14, a cellular network 9 via the gateway 20, or other IP network. The incoming call might be made, for example, using the regular phone 6 via the PSTN 7 or the cellular phone 10 via cellular network 9, as shown in FIG. 1. In other embodiments, the incoming call may originate from another VoIP network, for example, of another service provide via a gateway.

In step 602, the subscriber (user) of the PSTN 7 or cellular network 9 may be charged for calls made by the regular phone 6 via PSTN 7 or the cellular phone 10 via the cellular network 9. The PSTN service provider or cellular service provider may be credited for each call initiated on its network, which generates revenues for each service provider, respectively.

In step 603, the PSTN service provider or cellular service provider may be charged by the VoIP service provider 13 when the PSTN 7 or cellular network 9 connects to the IP network 3 via the VoIP proxy 13. The VoIP service provider 13 is credited for each incoming call entering via the VoIP proxy 13, which generates revenues for the VoIP service provider.

In step 604, the VOIP subscriber (user) 24 earns credits from the VoIP service provider 13 for receiving the incoming call originating from the PSTN 7 or cellular network 9. Credits may be earned, for example, based on the total duration (time) of the incoming call, or on a per call basis. Moreover, different rates may apply depending on the county of origin of the origination call and/or the softphone 23. In accordance with embodiments of the invention, the softphone 23 may display and/or audibly announce the credits to the user 24 during the call.

In step 605, other subscribers (users) 25, 26 of the VoIP service may also earn credits based on user 24 receiving the incoming call, in accordance with the multi-generation revenue sharing model, as discussed above.

Lastly, in step 606, VoIP subscribers may redeem accumulated credits to make outgoing calls via the PSTN 7 or cellular network 9. Ordinarily, VoIP subscribers placing calls, which terminating in the PSTN 7 or the cellular network 9, will be charged in most cases by the VoIP provider 13. By using accumulated credits earned from receiving incoming calls, subscribers may offset the costs of outgoing calls.

Additional credits may also be purchased from the VoIP service provider, if necessary. Alternatively, subscribers may use accumulated credits earned for the purchase of goods or services through the VoIP service provider and/or retail merchants and ecommerce websites affiliated with the VoIP service provider.

While embodiments have been described in connection with what is presently considered to be the most practical and preferred, it is to be understood that further modifications are possible. This application is intended to cover any variations, uses, equivalent arrangements or adaptations of the invention following, in general, the principles of the invention and including such departures from the present disclosure and followed in the spirit and scope of the appended claims.

What is claimed is:

1. A method for sharing revenue between a Voice over Internet Protocol (VoIP) service provider and a VoIP end user, comprising:
    charging a call fee to a first service provider for a specific incoming call, the call fee charged for connection of the specific incoming call, the call fee charged by a VoIP service provider,
        the incoming call passing a gateway maintained between a first network and an Internet Protocol (IP) network,
        the fee charged via a VoIP proxy associated with the VoIP service provider; and
    crediting a VoIP end user account of the VoIP service provider with at least a portion of the call fee charged to the first service provider for receiving the specific incoming call via the first network.

2. The method according to claim 1, wherein charging the fee to a first service provider is for an incoming call passing a gateway between one of a cellular network or a fixed line network and an Internet Protocol (IP) network.

3. The method according to claim 1 further comprising:
    displaying on a softphone credits credited by the VoIP service provider to the end user.

4. The method according to claim 2 further comprising:
    changing the balance of credits for the end user account during a call.

5. The method according to claim 4 further comprising:
    announcing the number of credits from the VoIP service provider that an end user has earned or used up during an ongoing call.

6. The method according to claim 1 further comprising:
    providing credits to an end user account when the credits are purchased by the end user of the VoIP service provider.

7. The method according to claim 3 wherein the displayed credits apply to voice calls made by the end user and video calls made by the end user.

8. The method according to claim 1 wherein crediting the VoIP end user account is credited at a rate that depends on the number assigned to the VoIP phone of the VoIP end user account.

9. The method according to claim 1 further comprising:
    registering a plurality of end users as subscribers to the VoIP service and
    awarding a portion of the credits for incoming calls to the registered plurality of end users.

10. The method according to claim 9 further comprising awarding one or more end user accounts with the portion of the credits for incoming calls to the registered plurality of end users up to 'n' generations.

11. The method according to claim 6 further comprising:
    showing the budget remaining for voice calls.

12. The method according to claim 2 further comprising:
    providing a choice to a VoIP end user,
        the choice allowing the VoIP end user to select a destination and
        the choice allowing the VoIP end user to view accumulated credit for a selected destination.

13. The method according to claim 12, wherein the destination is a number or country.

14. The method according to claim 1 further comprising:
offering the ability for a VoIP end user to use accumulated credits earned in a VoIP end user account, for the purchase of goods or services.

15. The method according to claim 1, wherein charges for multiple phone numbers are credited to the same VoIP end user account.

16. The method according to claim 1, wherein a the VoIP end user account has a plurality of Direct In Dialing (DID) numbers corresponding to national numbers in at least two countries world-wide and associated with the VoIP end user account.

17. A system for sharing revenue, for an incoming Voice over Internet Protocol (VoIP) call, between a VoIP service provider and a VoIP end user, comprising:
a VoIP proxy server having a processor,
the VoIP proxy server processor configured with code resident in memory such that when executed, the code configures the VoIP proxy server to charge a first service provider for connecting a specific incoming call from a first network to an Internet Protocol (IP) network, if the incoming call is to a VoIP end user of a VoIP service provider, and
the VoIP proxy server processor is further configured to provide credits to an account of the VoIP end user with a portion of said charge to the first service provider.

18. The system of claim 17 wherein the first network comprises a cellular network or a fixed line network.

19. The system of claim 17 wherein the VoIP proxy server is further configured to provide credits to an account of a VoIP end user running a softphone client on one of a wireless device, desktop computer, laptop computer, PDA, gaming console, or server.

20. The system of claim 17 wherein the proxy server is further configured to allow the VoIP end user to use accumulated credits to make outgoing VoIP calls credits over the first network.

21. The system of claim 18 wherein the fixed line network is a public telephony network (PSTN).

22. The system of claim 17 wherein the VoIP proxy server is further configured to provide credits to a VoIP end user account with additional credits purchased by a VoIP end user through the VoIP service provider.

23. The system of claim 17 wherein the VoIP proxy server is further configured to provide partial credits to a VoIP end user account for incoming calls to other VoIP end users.

24. The system of claim 23 wherein the server is further configured to award with credits to a VoIP end user based on user registrations registered by the VoIP end user account being credited.

25. The system of claim 17 wherein the VoIP proxy server is further configured to provide credits to an account of a VoIP end user where the VoIP end user is using a mobile phone with VoIP capabilities.

26. The system of claim 17 wherein the VoIP proxy server is further configured to provide credits to an account of a VoIP end user where the VoIP end user is using an Analog Terminal Adaptor (ATA) along with analog phone.

27. The system of claim 17 wherein the VoIP proxy server is further configured to provide credits to a VoIP end user account where the VoIP service end user has a plurality of Direct In Dialing (DID) numbers corresponding to national numbers in at least two countries world-wide and associated with the VoIP end user.

* * * * *